United States Patent
Abanades García et al.

(10) Patent No.: US 8,506,915 B2
(45) Date of Patent: Aug. 13, 2013

(54) METHOD FOR RECOVERING $CO_2$ BY MEANS OF CAO AND THE EXOTHERMIC REDUCTION OF A SOLID

(75) Inventors: Juan Carlos Abanades García, Oviedo (ES); Ramón Murillo Villuendas, Zaragoza (ES)

(73) Assignee: Consejo Superior de Investigaciones Cientificas, Madrid (ES)

( * ) Notice: Subject to any disclaimer, the term of this patent is extended or adjusted under 35 U.S.C. 154(b) by 0 days.

(21) Appl. No.: 13/390,244

(22) PCT Filed: Sep. 7, 2010

(86) PCT No.: PCT/ES2010/070585
§ 371 (c)(1),
(2), (4) Date: May 31, 2012

(87) PCT Pub. No.: WO2011/033156
PCT Pub. Date: Mar. 24, 2011

(65) Prior Publication Data
US 2012/0230897 A1    Sep. 13, 2012

(30) Foreign Application Priority Data
Sep. 16, 2009  (EP) .................................... 09382169

(51) Int. Cl.
*B01D 53/62* (2006.01)
*C01B 3/50* (2006.01)
*C01B 3/56* (2006.01)

(52) U.S. Cl.
USPC ........... 423/230; 423/650; 423/651; 423/652; 48/197 R; 48/198.5; 48/202

(58) Field of Classification Search
USPC ............... 423/230, 650, 651, 652; 48/197 R, 48/198.5, 202
See application file for complete search history.

(56) References Cited

U.S. PATENT DOCUMENTS 5,509,362 A    4/1996  Lyon
5,827,496 A    10/1998 Lyon
(Continued)

FOREIGN PATENT DOCUMENTS
EP    0871537 B1    11/2003

OTHER PUBLICATIONS

Abanades, et al., Fluidized Bed Combustion Systems Integrating $CO_2$ Capture with CaO, Environ. Sci. Technol. 2005, 39, 2861-2866.
(Continued)

*Primary Examiner* — Timothy Vanoy
(74) *Attorney, Agent, or Firm* — Blank Rome LLP

(57) ABSTRACT

This invention involves a cyclic method for capturing $CO_2$ from gas streams arising from processes of reforming, gasification or combustion of carbonaceous fuels. The method is based on these gas streams reacting with solids that contain at least CaO and a metal or an oxidized form of the metal. The method is characterized by the oxidized form of the metal being able to undergo a sufficiently exothermic reduction reaction for the heat released during the reaction to cause the decomposition of $CaCO_3$. The thermodynamic and kinetic characteristics of the method of this invention make it ideal for the removal of the $CO_2$ present in gas streams resulting from processes such as hydrocarbon reforming or the combustion of carbonaceous fuels.

16 Claims, 5 Drawing Sheets

(56) References Cited

U.S. PATENT DOCUMENTS

| | | | |
|---|---|---|---|
| 6,911,057 B2 | 6/2005 | Lyon | |
| 7,445,649 B2* | 11/2008 | Andrus et al. | 48/197 R |
| 2003/0035770 A1 | 2/2003 | Cole | |
| 2004/0237404 A1 | 12/2004 | Andrus et al. | |
| 2011/0124748 A1* | 5/2011 | Kuku | 518/700 |

OTHER PUBLICATIONS

Harrison, Sorption-Enhanced Hydrogen Production: A Review, Ind. Eng. Chem. Res. 2008, 6486-6501.

Hossain, et al., Chemical-looping combustion (CLC) for inherent $CO_2$ separations—a review, Chemical Engineering Science 63 (2008) 4433-4451.

Kumar, et al., Unmixed Reforming a Novel Autothermal Cyclic Steam Reforming Process, Advances in Hydrogen Energy, Kluwer Academic/Plenum Publishers, 2000, pp. 31-45.

Shimizu, et al., A Twin-Fluid-Bed Reactor for Removal of $CO_2$ from Combustion Processes, Trans IchemE, vol. 77, Part A, Jan. 1999, p. 62-68.

Wang, et al., Clean Combustion of Solid Fuels, Applied Energy 85 (2008) 73-79.

International Search Report issued in PCT/ES2010/070585 on Nov. 3, 2010.

Metz, et al., IPCC Special Report on Carbon Dioxide Capture and Storage, Intergovernmental Panel on Climate Change (IPCC), 2005.

\* cited by examiner

METHOD FOR RECOVERING CO₂ BY MEANS OF CAO AND THE EXOTHERMIC REDUCTION OF A SOLID

This application is the U.S. national phase of International Application No. PCT/ES2010/070585, filed Sep. 7, 2010, which claims the benefit of Spanish Patent Application No. 09382169.2, filed Sep. 16, 2009.

This invention relates to a cyclic method for capturing $CO_2$ from gas streams arising from processes of reforming, gasification or combustion of carbonaceous fuels which comprises making these gas streams reacting with solids that contain at least CaO and a metal or an oxidized form of the metal. The method is characterised by the oxidized form of the metal being able to undergo a sufficiently exothermic reduction reaction for the heat released during the reaction to cause the decomposition of $CaCO_3$.

PRIOR STATE OF THE ART

The capture of the $CO_2$ produced in industrial processes is essential for an effective fight against climate change in the next few decades. As is well known, these technologies allow the large-scale use of fossil fuels for the generation of electricity, heat or hydrogen, with very low $CO_2$ emissions. The UN's Intergovernmental Panel on Climate Change, IPCC, published a Special Report on $CO_2$ Capture and Storage (IPCC, 2005, www.ipcc.ch) that reviewed existing and developing technologies designed to capture the $CO_2$ generated in large stationary sources and their subsequent permanent storage in a variety of deep geological formations. In order to store $CO_2$ on a large scale, it is first necessary to obtain a stream of gas with a high concentration of $CO_2$ ("$CO_2$ capture"). The capture of $CO_2$ is the most costly step in economic and energy terms (IPCC, 2005). In existing processes designed to absorb $CO_2$ from combustion gases by washing with chemical solvents ($CO_2$ capture by post-combustion), there is a large energy penalty due to the high consumption of heat in the regeneration step. There is also a large increase in the investment required due to the large equipment necessary to treat gases at atmospheric pressure. In oxy-combustion technologies, the energy and economic penalty arises from the large-scale air separation plant that requires cryogenic methods to obtain all the necessary $O_2$ for the combustion of the fuel. Pre-combustion processes are intrinsically more energy-efficient in the gas separation step, since they operate under pressure, but costly gasification or reforming steps are required, followed by purification and water-gas shift (CO+$H_2O \leftrightarrows CO_2+H_2$) steps to convert the fuel into a mixture of $CO_2$ and $H_2$. The main commercial processes used for these pathways are discussed and reviewed in more detail in (IPCC, 2005). There is great interest worldwide in developing new $CO_2$ capture technologies intended to reduce the energy penalty and the cost of the capture equipment. Particularly relevant are two families of gas separation processes which use reversible, high-temperature gas-solid reactions to transport $CO_2$ or $O_2$ between different reactors or steps, during which the following reaction or its reverse may take place:

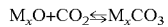

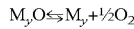

In the first case, the most widely studied carbonation reactions for $CO_2$ separation processes are those related to the use of CaO, although $M_xO$ could also be other oxides (from Li, K, Na, Mg, Ba etc.). Recently a review of the processes proposed since the late 19th-century that use CaO as regenerative sorbent of $CO_2$ in coal ("acceptor process") or biomass gasification processes, or sorption enhanced reforming of natural gas (SER) or other gaseous hydrocarbons has been published (D. P. Harrison, Sorption-Enhanced Hydrogen Production: A Review, Ind. Eng. Chem. Res. 2008, 47, 6486-6501). As an example, in the case of methane, the steam reforming reaction in the presence of CaO would be:

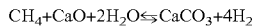

The benefit of the presence of CaO in the above reaction, or its equivalents with other carbonaceous fuels and hydrocarbons, has been widely referred to in the state of the art. On the one hand, the (exothermic) carbonation reaction supplies heat to the system, making the enthalpy of the overall preceding reaction practically neutral. On the other hand, the equilibrium of the intermediate step in the preceding reaction, the water gas shift reaction, is shifted to the right thanks to the absorption of $CO_2$ by CaO. Theoretically, this offers great advantages for energy efficiency and costs in the hydrogen production step. However, a significant problem is that the entire process requires the subsequent calcination of $CaCO_3$ to produce $CO_2$ and CaO (enthalpy of about 182 kJ/mol under normal conditions), which requires a large energy supply. Furthermore, since the objective of any $CO_2$ capture process is to generate a stream with a very high concentration of $CO_2$, the calcination of $CaCO_3$ must be performed in $CO_2$-rich atmospheres. In these conditions, equilibrium demands very high calcination temperatures (about 900° C. in pure $CO_2$ at atmospheric pressure), and the heat transfer to the system is in practice highly problematic in all the processes proposed. Shimizu et al. (A twin fluid-bed reactor for removal of $CO_2$ from combustion processes. Shimizu, T.; Hirama, T.; Hosoda, H.; Kitani, K.; Inagaki, M.; Tejima, K. Trans. IChemE 1999, 77 (Part A), 62) proposed the idea of burning a fuel with pure $O_2$ in the $CaCO_3$ calciner, but this introduces a significant energy penalty due to the cryogenic air separation plant required to obtain pure $O_2$. Processes that operate at very high temperatures have been described in which the $CaCO_3$ regeneration heat is transferred from the combustion chamber itself, assisted by the use of steam and/or vacuum in the calciner (Fluidized Bed Combustion Systems Integrating CO2 Capture with CaO. Abanades, J. C.; Anthony, E. J.; Wang, J.; Oakey, J. E. Environ. Sci. Tech. 2005, 39 (8), 2861). However these processes are complex and they may require special materials as yet not developed. They are limited to certain fuels and they are not applicable to already-existing CO2 generation plants. The problem of the calcination of $CaCO_3$ to generate CaO and a stream with a high concentration of $CO_2$ susceptible to geological storage also exists in the cement production industry, which calcines large quantities of $CaCO_3$. The problem of the calcination of $CaCO_3$ to generate CaO and a stream with a high concentration of $CO_2$ is even greater in high-pressure processes, due to the need to work at even higher calcination temperatures in order to overcome the equilibrium pressure of $CO_2$.

Therefore, it can be concluded that there is no optimal solution at present for the problem of calcining $CaCO_3$ while generating a stream with a high concentration of $CO_2$.

The second family of new $CO_2$ capture processes mentioned above makes use of oxidation-reduction reactions of transition metals (Fe, Ni, Co, Mn, Cu, etc.) or other redox equilibria ($CaS/CaSO_4$ or others) to transport $O_2$ from the air to the fuel gas molecules in a very energy-efficient and selective manner, without direct contact taking place between the air and the fuel (the processes are usually referred to as unmixed combustion, flameless combustion, or chemical looping combustion). In these processes, the metal (or the CaS) is oxidised in the oxidation reactor, or "air reactor", at a high temperature, in a process that is always highly exothermic. The metal oxide (or $CaSO_4$) is subsequently transported to a reduction reactor, or "fuel reactor", where the fuel is oxidised and the metal oxide (or the $CaSO_4$) is reduced, in a reduction step that is normally endothermic (except in the case of reduction of CuO to Cu or $CaSO_4$ to CaS, which is exothermic in the case of some gases of interest). These combustion processes have been primarily studied for gases, with the aim of achieving the complete oxidation of the fuel gas to $CO_2$ and $H_2O$. But recently, new proposals for combustion processes for solid fuels and for processes of incomplete oxidation or reforming of fuel gases ("chemical looping reforming") have been made. For the case of reaction systems with a metal and its metal oxide, a recent review of this family of processes may be found in the paper: Chemical-looping combustion (CLC) for inherent $CO_2$ separations, Mohammad M. Hossain, Hugo I. de Lasa (Chem Eng. Sci., 63 (2008) 4433-4451). For the CaS—$CaSO_4$ system, information can be found in: Clean combustion of solid fuels, Jinsheng Wang, Edward J. Anthony (Applied Energy, vol. 85, (2-3), 2008, 73-79),. It is also worth mentioning that, in these processes, the maximum electricity or hydrogen generation efficiencies are obtained by operating the oxidation reactor at high pressures. This is especially important when the temperature of the gases resulting from the oxidation step is increased to fit typical gas turbine inlet temperatures, which usually requires combustion of additional natural gas between the oxidation reactor and the turbine. Evidently, this method which was designed to increase the turbine efficiency has the disadvantage that the carbon contained in the additional fuel is not captured and is emitted to the atmosphere as $CO_2$ in the turbine exhaust gases.

The theoretical advantages of this family of "flameless combustion" or "chemical looping" processes operating under pressure are noteworthy, due to the negligible energy penalty involved in obtaining a separate $CO_2$ stream in the overall process of combusting fuel in air. However, the technology is still in a very preliminary stage of development. On the one hand, its application to solid fuels may lead to significant difficulties with regards to the management of ashes and impurities. Wang and Anthony (2008) claim that the flameless combustion or "chemical looping" process that uses the reduction reaction of $CaSO_4$ to CaS with CO avoids these problems. Here the problem is obtaining CO from the gasification of C with $CO_2$, since this reaction is very endothermic and requires a large amount of external energy, which is difficult to transfer given the high temperatures needed in the gasifier. Patent US 2004/0237404 also proposes hydrogen production methods based on the presence of CaO, by forming $CaCO_3$ which is calcinated by means of heat transported by solids that circulate from an oxidation step of CaS to $CaSO_4$. The cycle ends with the endothermic reduction reaction of $CaSO_4$ to CaS using certain carbonaceous fuels, and the heat is also transferred between reactors by the circulation of solids at different temperatures.

On the other hand, the main application of the flameless combustion processes described above to natural gas or other clean fuel gases requires that these systems operate at a very high pressure and temperature, so that gas turbines may be used and the high electricity conversion efficiencies typical of combined gas cycles may be obtained. However, the highly exothermic or endothermic character of the redox reactions involved make it preferable to work with interconnected circulating fluidised-bed systems. These reactor systems however, are relatively exotic, because experience or practical examples are lacking of circulating fluidised beds operated at pressure and upstream of a gas turbine.

For all these reasons, there is still an evident need to find flameless combustion methods that are more feasible in practise and which make better use of the high-efficiency potential of modern gas turbines. Along these lines, patent U.S. Pat. No. 5,509,362 combines, for the first time, reforming methods in the presence of CaO described in the previous state of the art, introducing "flameless combustion" methods of a fuel with a metal oxide to solve the problem of the endothermic regeneration of the $CaCO_3$ generated during the reforming step. Specifically, one of the applications of this invention (referred to as K) proposes using CaO as a $CO_2$ sorbent during the reforming of a fuel gas, in such a way that the CaO is mixed with FeO in a fixed bed. Part of the hydrogen produced during the reforming reaction reduces a large part of the FeO to Fe in the same bed. When the bed has almost consumed the CaO (converted into $CaCO_3$) and a sufficient amount of the bed has been converted to Fe, the problem of the regeneration of $CaCO_3$ can be solved by initiating an air feed cycle in the reactor, such that the exothermic oxidation reaction from Fe to FeO with air is capable of generating the heat required to decompose the $CaCO_3$. In a later patent, U.S. Pat. No. 5,827,496, the same method (referred to as E) is described in more detail and is extended to other systems with CaO (including the option of supporting CaO on a ceramic matrix) and other redox systems that may be used in "unmixed combustion" processes, which include copper and copper oxides, iron and iron oxides, nickel and nickel oxide, cobalt and cobalt oxides, and mixtures of these solids. The preferred mixture is CaO/$CaCO_3$ and Ni/NiO due to the good catalytic properties of Ni in reforming reactions, although it is indicated that, if other redox systems are used, it might be necessary to use noble metals with a good catalytic activity instead of nickel.

The methods proposed by Lyon described in the preceding paragraph elegantly solve the problem of the calcination of the $CaCO_3$ generated in hydrogen production steps by means of enhanced reforming by the presence of CaO. These methods take advantage of the efficiency with which the heat is transferred from the metal particles oxidised with air to the $CaCO_3$ particles in the same bed. Moreover, a later publication by the same group (Unmixed reforming: a novel autothermal cyclic steam reforming process, in Advances in Hydrogen Energy, R. V. Kumar, R. K. Lyon, J. A. Cole. Padró and Lau, eds., Kluwer Academic/Plenum Publishers, 2000) presents an experimental validation of the operation of these fixed beds, showing that all the reactions take place on narrow reaction fronts, which makes it possible to design cyclic operations in the same bed of solid materials, by alternating the feeding of the gaseous reactants, by adjusting the temperature and pressure conditions in the fixed beds, and by employng different time cycles. But it is worth mentioning here that these processes only partially solve the problem of $CO_2$ emissions from the overall system. This is because the $CO_2$ generated in the decomposition of $CaCO_3$ leaves the metal oxidation reactor highly diluted by the $N_2$. It is therefore emitted to the atmosphere from the oxidation reactor.

In a later patent, U.S. Pat. No. 6,911,057-B2, Lyon discloses a new process that claims to have solved the above-mentioned problem. This process employs a system of three interconnected fluidised beds where adequate quantities of CaO, $Fe_2O_3$, or their derivatives, $CaCO_3$ and FeO, circulate. The first bed is a coal gasifier under pressure, where $CO_2$ reacts with CaO to form $CaCO_3$ and hydrogen, as described in the previous state of the art. The second, central bed receives two streams: one of them contains solids with part of the coal that was not converted in the first bed and the other receives $Fe_2O_3$ from the third bed at a very high temperature (>1,500° C.). These solids react in the second bed to generate part of the heat necessary for the decomposition of $CaCO_3$. Consequently, the outlet streams from the second bed contain CaO which serves to maintain the reaction in the first bed. They also contain a certain amount of FeO that must be re-oxidised with air, to form $Fe_2O_3$, in the third bed, for the cyclic reaction process to be completed.

The above patent theoretically resolves the problem of the conversion of fuel to hydrogen with a separate generation of a pure $CO_2$ stream. It makes use of well known theoretical advantages of working with the $CaO/CaCO_3$ cycle in the reforming of a fuel and the well known theoretical advantages of using "unmixed combustion" processes with metal/metal oxide redox systems. However, it is evident that there numerous practical obstacles obstructing the development of the process. As mentioned above, the operation of interconnected fluidised beds under pressure, in which the exhaust gases are fed into high-efficiency gas turbines, is not a well proven practice in industry. Moreover, the combustion of the solid fuel from the first bed using solid $Fe_2O_3$ from the second bed is not a trivial achievement, because solid-solid reactions tend to be slow and always take place through intermediate gasification steps. On the other hand, the temperature required to operate the third bed is very high (1,400-1,600° C.) and the solids in the second bed that contain CaO or $CaCO_3$ will tend to become drastically deactivated at the said temperatures and lose their $CO_2$ absorption capacity in the first reforming reactor.

From the above discussion, we may conclude that the processes proposed so far for the capture of $CO_2$ with no energy penalty, using reversible high-temperature gas-solid reactions (with $CaO/CaCO_3$ systems, with metal/metal oxide systems or with combinations of these two systems), lead to one or more practical obstacles that hinder their implementation or drastically reduce their theoretical benefits.

DESCRIPTION OF THE INVENTION

This invention proposes a solution to the problems raised above, by disclosing a new method for $CO_2$ capture with no energy penalty and which can be applied to existing reforming, gasification or combustion processes of any carbonaceous fossil fuel or biomass.

A first aspect of this invention comprises a cyclic method for capturing the $CO_2$ contained in gas streams which is based on these gas streams reacting with solids that comprise CaO (s) and a second solid or the oxidised form of the said second solid. The method is characterised by the oxidised form of the second solid being able to undergo a sufficiently exothermic reduction reaction for the heat released during the reaction to cause the decomposition of $CaCO_3$ Preferably, in the method described above, the second solid is a metal or the oxidised form of the metal, or an alkaline-earth sulfide or its sulfate.

As a second solid for the $CO_2$ capture method of this invention any metal oxide may be used as long as its reduction reaction with a fuel gas is exothermic, the use of metal oxides with highly exothermic reduction reactions being preferable. Since the oxygen transport capacity is much greater (per mass unit of oxide) and the kinetics and the reversibility of the oxidation and reduction reactions are faster in the case of the CuO—Cu system, the description and the examples of this invention for metal oxides primarily refer to the CuO—Cu system. More preferably, the second solid is Cu and its oxidised form CuO, or alternatively the second solid is CaS and its oxidised form $CaSO_4$.

The use of an exothermic reduction reaction of a solid (hereafter preferably CuO to Cu) to obtain the necessary heat for the calcination of $CaCO_3$ to CaO will generate a stream with a high concentration of $CO_2$ and a sorbent (CaO) which is active in several steps of the $CO_2$ capture process. The use of an exothermic reduction reaction of a solid to facilitate the decomposition of $CaCO_3$ in cyclic $CO_2$ capture methods is wholly innovative. This type of calcination makes it possible to drastically reduce the energy penalty in $CO_2$ capture methods that use carbonation-calcination cycles of $CaO/CaCO_3$. The advantage of the simultaneous reduction and calcination step characteristic of this invention with respect to current carbonation-calcination methods described in the state of the art is the absence of the energy penalty associated with the cryogenic production of $O_2$.

In a preferred embodiment, this invention relates to a method that comprises the following steps:
a) Carbonation of CaO with the $CO_2$ contained in the gas stream to be treated, in the presence of the second solid in its reduced form.
b) Oxidation of the second solid of step (a) with air, in the presence of the $CaCO_3$ formed in the carbonation of CaO.
c) Reduction of the oxidised form of the second solid obtained in step (b) with a fuel gas and the simultaneous calcination of $CaCO_3$.

This can be compared to other methods described in the state of the art, in which $CaCO_3$ is calcined using an oxidation reaction of a metal or of CaS with air, as a result of which a stream of $CO_2$ diluted in nitrogen is emitted to the atmosphere. In contrast, the advantage of the $CO_2$ capture method employed in this invention is the generation, during the simultaneous reduction and calcination step, of a gas stream with a very high concentration of $CO_2$ and steam, which $CO_2$ may be easily separated for different uses or for permanent geological storage.

Compared to other methods in which $CaCO_3$ is calcined with the heat released from other high-temperature devices, the advantage of the simultaneous reduction and calcination step lies in the high efficiency with which heat is transferred between reactions that take place in the same reactor. This allows moderate operation temperatures to be used in all the devices, leading to savings in energy and special materials and the avoidance of complex heat exchange steps at very high temperatures.

The generation of CaO in the calcination of $CaCO_3$ using the heat released from the reduction of CuO to Cu opens the door to different cyclic $CO_2$ capture methods in various processes that convert fuels into useful energy. The general scheme of the cyclic reactions involved in the invention is shown in FIG. 1 in the case of the CuO/Cu system. A similar scheme could be shown for the $CaSO_4/CaS$ system, since $CaSO_4$ also undergoes a highly exothermic reduction reaction with some fuel gases (particularly with CO).

In a preferred embodiment of the method as described above, the gas stream to be treated comes from a gas reforming process or a solid fuel gasification process. Preferably, these solid fuels are selected from biomass or reactive coals.

In a preferred embodiment, the fuel gas for the method described above is selected from natural gas, synthesis gas or gasification gas with a high CO content and low or zero $N_2$ content.

In another preferred embodiment, this invention relates to a method that comprises the following steps:
a) Carbonation of CaO with the $CO_2$ contained in the gas stream to be treated, in the presence of the second solid in its oxidised form.

b) Reduction of the oxidised form of the second solid with a fuel gas and the simultaneous calcination of the $CaCO_3$ obtained in step (a).
c) Oxidation of the reduced form of the second solid obtained in step (b) with air, in the presence of the CaO formed in the calcination of $CaCO_3$.

Preferably, in this method, the gas stream to be treated comes from the combustion of a carbonaceous fuel in air.

In a preferred embodiment, the fuel gas in the reduction step is selected from natural gas, synthesis gas or gasification gas with a high CO content and a low $N_2$ content, the latter being more preferred.

In a preferred embodiment, part of the gas resulting from the metal oxidation step is cooled and re-circulated in order for it to mix with the air used in the metal oxidation step. Preferably, the rest of the gas resulting from the metal oxidation step is mixed with air and a fuel, expanded in a gas turbine.

Preferably, the method of this invention is performed in interconnected fixed-bed or fluidised-bed reactors.

Preferably, the oxidation step is performed at a temperature of between 700° C. and 900° C. In another preferred embodiment, the oxidation step is performed at a pressure of between 20 and 30 atmospheres.

Preferably, the reduction and calcination step is performed at a temperature of between 800° C. and 900° C. at atmospheric pressure; more preferably, the reduction and calcination step is performed at a pressure below atmospheric pressure in order to reduce the partial pressures of $CO_2$ and accelerate the calcination reaction.

In a preferred embodiment, the reduction and calcination step is carried out with additional steam fed in, in order to reduce the partial pressures of $CO_2$ and accelerate the calcination reaction.

In order to understand the advantages of the methods described in this invention, it is worth emphasizing that, as already discussed for other processes disclosed in the state of the art, when reversible high-temperature solid reactions are used, the energy supplied by the fuel that is fed into the system is identical to the energy released by the fuel during its complete combustion to $CO_2$ and $H_2O$ in conventional combustion processes with air. However in the system of overall reversible reactions shown in FIG. 1, which is used in this invention, the energy originally contained in the fuel is released in the form of chemical energy contained in $H_2$ and/or Cu. Therefore, in the $CO_2$ capture method of this invention, most of the energy ends up being released in $CO_2$-emission-free devices which are fed with carbon-free fuels ($H_2$ and/or Cu susceptible to oxidation to $H_2O$ and CuO, releasing useful energy).

The practical implementation of this general method to specific fuels and specific combustion gases makes it possible to define various specific $CO_2$ capture methods for both fuel reforming or steam gasification processes and a process that captures $CO_2$ from combustion gases.

A first point to be consider regarding the application of the methods of $CO_2$ capture of the invention is related to the behaviour of the solid sorbents, or of the fixed or fluidised beds of solids, in the different steps that make up the different processes. First of all, the proportion of the main elements must be clearly defined (the Ca/Cu molar ratio, taking into account the enthalpies of reaction under the reaction conditions). In the case of the CuO/Cu system (a similar procedure could be employed for the $CaS/CaSO_4$ system), these enthalpies vary depending on the nature of the fuel used in the reduction step. When $CH_4$ is used as the fuel in the reforming reaction, the overall reaction in the reforming step, which includes the capture of $CO_2$ with CaO at 600° C., is slightly exothermic (−17.9 kJ/mol). If $CH_4$ is also used in the $CaCO_3$ regeneration step for the reduction of CuO to Cu (−157 $kJ/molCH_4$ LHV under normal conditions):

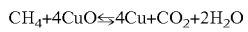

In these conditions, the heat generated by this reaction must be identical to the heat of decomposition of $CaCO_3$ (about +167 kJ/mol at 850° C.). Taking into account the slight differences in enthalpies of reaction, 4.2 moles of Cu are required per mole of active Ca in the sorbent (moles of $CaCO_3$ formed) in order for the overall enthalpy of the overall calcination reaction of $CaCO_3$ and the above reduction reaction to be equal to zero.

When synthesis gas is used in the reduction of CuO and the regeneration of $CaCO_3$, the reaction for an equimolar mixture of CO and $H_2$ is:

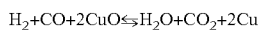

Since the enthalpies of reduction of CuO with $H_2$ (−80 $kJ/mol H_2$) and CO (−131 kJ/mol CO) are greater per mole of CuO than those of methane, it is evident that the use of these gases in the reduction and calcination step is favourable in all the methods, especially when synthesis gases with the maximum CO content are used. In the case of CO, a minimum theoretical Cu/Ca molar ratio of 1.3 is required (as compared to 4.2 in the case of $CH_4$) to make the enthalpy of the overall reaction of the reduction and calcination step equal to zero. The presence of a support that accompanies CaO and Cu, or of a third solid with catalytic properties for some of the reactions involved in the specific methods, must be kept to the minimum permitted by the sorbent preparation method, in order to minimize the demand for additional heat in order to heat these materials up to the reaction conditions. It is evident that the Cu/Ca molar ratio values specified above are only indicative. Moreover, in real processes it may be necessary to supply additional heat in order to heat up the reagents and products. Alternatively, it may be possible to propose auxiliary forms of supplying external heat to the $CaCO_3$ calcination step with heat exchanger techniques already known in the state of the art, such that all the heat required by the $CaCO_3$ regeneration reactor does not have to be obtained from the exothermic CuO reduction reaction.

Now that a minimum, illustrative Cu/Ca molar ratio has been established, it is worth reviewing briefly the experimental information that is already available about the main reactions of solids containing sufficiently high quantities of CaO and CuO. On the one hand, it is necessary that the CaO/$CaCO_3$ and Cu/CuO reactions be reversible, not only thermodynamically, but also from the kinetic standpoint. The calcination reaction may be very fast and practically complete over a broad range of temperatures, about 800° C. and higher, preferably between 750° C.-900° C. at atmospheric pressure, depending on the partial pressure of $CO_2$. Unfortunately, the reverse carbonation reaction of CaO to produce $CaCO_3$ is only fast up to a certain level of conversion. It then quickly decreases with the number of cycles, towards a residual value which has been experimentally established at about 7% for natural limestones. However values greater than 20% have already been reported for other $CaCO_3$ materials or pellets, synthetically prepared, or supported, or cemented with ceramic materials similar to those used to support commercial catalysts.

Therefore, although new developments and methodologies for the preparation of suitable special sorbents for the methods of this invention may be expected in the future, the claims of our invention remain unaffected by these independent developments and, throughout the rest of the discussion about the methods, it is assumed that a suitable sorbent is already available, which is reversible in the carbonation and calcination reactions, and in oxidation-reduction reactions, with an active CaO content that is approximately between 5%-25% in weight and an active CuO content of between 10% and 70%. As in all other reversible reaction systems described in the state of the art, the periodical or continuous purging of low-activity sorbent and its replacement with fresh sorbent must be considered.

The specific methods described below also consider as a part of the state of the art the individual devices (gas turbines, fuel cells) necessary to obtain electricity or useful work from the combustion of $H_2$ or the expansion of the air heated as a result of the oxidation of Cu to CuO. The auxiliary devices (solid fuel gasifiers or hydrocarbon reformers) designed to produce synthesis gas are also considered to be a part of the state of the art, as are heat exchanger devices and their different forms of integration within the system, designed to maximise overall energy efficiencies. Also considered as a part of the state of the art are the different ways of preparing or arranging sorbent particles, pellets or (fixed or fluidised) beds of $CaCO_3$ and CuO solids (or their derivatives, Cu and CaO), with the appropiate fractions and granulometry to allow the application of the different methods described in this invention. Each method may require a different preparation technique to mix and support the active materials. In some cases these will be accompanied by additional noble metal catalysts or other catalysts described in the state of the art as active catalysts for the reforming reactions. Another important part of the state of the art are the operations designed to purify the gases resulting from each step of the process. Also important as part of the state of the art are the solid feeding and purging lines or solid replacement steps, which make it possible to maintain the activity of the reacting materials and purge the inert materials (ashes or solid reaction by-products) introduced into the system by the fuels. All the non-essential equipment, which is a part of the state of the art and may be omitted in the description of the methods disclosed in this invention, has been excluded from the explanatory Figures.

Below we propose two specific processes (one for reforming and one for solid fuel gasification) that begin with reaction steps carried out in well known state-of-the-art devices (gasifiers in "acceptor" processes or reforming reactors in enhanced reforming processes), in which the following overall reaction takes place:

$CaO+Cu+fuel+H_2O \leftrightarrows CaCO_3+Cu+H_2$ (not adjusted)

A first specific method arising from this invention is that of capturing $CO_2$ from reforming gases resulting from natural gas (or other gaseous hydrocarbons) with steam, as shown in FIG. 2. The reforming reactor A is fed with a natural gas stream 11 and a solids stream 33 that contains the material (CaO and Cu) with the necessary quantities of CaO to allow the following reaction to take place:

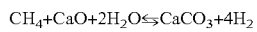
$CH_4+CaO+2H_2O \leftrightarrows CaCO_3+4H_2$

The Cu present in the sorbent during the reforming step has a known catalytic activity in reforming reactions of methanol and $CH_4$ with $CO_2$ (dry reforming). For this reason an additional catalyst may not be necessary in this step. In any event, the presence of CaO, Cu and, optionally, other catalysts, makes it possible to achieve the conditions required to operate reactor A and take gas stream 12 to favourable equilibrium conditions at very high degrees of decarbonisation and at high hydrogen concentrations.

The solid product of stream 13 generated in reactor A has a high concentration of $CaCO_3$ and Cu, and must be taken to a reactor for the oxidation of Cu to CuO (reactor B), where oxidation will take place with air stream 27. The oxidation reaction in reactor B must be designed in such a way that the maximum utilisation of the energy from the oxidation of Cu to CuO is achieved, since this is the main output for the energy that is fed throughout the entire system of FIG. 2 in the form of fuel. Step B must also be designed in such a way that the decomposition of $CaCO_3$ in this oxidation reactor is kept at a minimum, since the $CO_2$ released in this reactor is emitted to the atmosphere in the exhaust gases of turbine 24, jointly with the components of air stream 27 that is being fed into the reactor. Stream 24 contains a volume fraction that is lower than, or equal to, the quotient between the equilibrium partial pressure of $CO_2$ at the temperature of reactor B and the total pressure in reactor B. Therefore, in order to minimise $CO_2$ losses, it is preferable to operate reactor B at a high pressure.

In a preferred embodiment, the air necessary for the oxidation of Cu to CuO in reactor B (stream 27) is compressed in compressor D to about 20-30 atmospheres and mixed with the recycled stream 25, which is very rich in $N_2$, before the resulting stream 21 enters the reactor. In this way, the flow and the $O_2$ concentration of stream 21 may be independently adjusted using the recycling ratio of stream 25. The gases under pressure in stream 21 react with Cu to produce CuO and are heated to the operating temperature of reactor B, preferably around 700° C., in order to limit the decomposition of $CaCO_3$ to $CO_2$ (the equilibrium pressure of $CO_2$ at 700° C. is approximately 0.035 atm). Stream 25 is taken from the stream of hot gases 22 (primarily made up of $N_2$ since the oxygen has been consumed in the Cu oxidation reaction). Thus heat may be extracted from stream 25 (exchanger not included in the figure for the sake of simplicity). Stream 23, which contains the remaining gases, will then expand and drive the gas turbine.

Another preferred embodiment of this method consists in operating reactor B at higher temperatures, up to 850° C., thereby accelerating the rates of oxidation even more and increasing the temperature of the gases at the turbine inlet. In this case, since the partial pressure of $CO_2$ may reach 0.48 atm (equilibrium at 850° C.), it is essential to operate at a high pressure (20-30 atmospheres) in order that the volume fraction of $CO_2$ in exhaust stream 24 remains low and the CO2 exhaust flow is kept within acceptable limits.

Another possibility not considered in the figure, for the sake of simplicity, is to perform recycling 25 with gases that have already expanded in turbine E and then cooled. The advantage of this method is the flow rate of gases under pressure that expand in the turbine is higher. The disadvantage is the need for more energy to re-compress stream 25 and the need for more fuel (streams 51 or 52) in order to raise the temperature of the gases entering the turbine.

In order to maximise the electricity efficiency of the said gas turbine, the preferred option is to combust the gas generated in reactor A (primarily $H_2$ and, therefore, with a low carbon content, represented by stream 52) using a second air stream obtained from compressor D, so that the mass flow of stream 23 and the temperature of the gas expanded in the turbine are optimal for the use in commercial natural gas turbines with few modifications.

Another preferred option (not considered in FIG. 2 for the sake of simplicity) is to use the $H_2$ generated in reactor A in a fuel cell.

Another preferred option is to burn a small part of the natural gas with air under pressure (stream 51) in order to raise the temperature and the flow of turbine inlet gases to the conditions that maximise the efficiency. The carbon contained in the extra natural gas fed in (stream 51) is emitted to the atmosphere as $CO_2$ very diluted in the turbine exhaust gases (stream 24), reducing the system's overall $CO_2$ capture efficiency. However, this is a minor carbon fraction compared to the total amount of carbon used in the process (streams 11 and 31) and it allows to the $H_2$ produced in reactor A for to be used for other purposes.

A third step, common to all the options of this first embodiment of the invention, consists in regenerating the $CaCO_3$ formed in reactor A by means of the reduction of the CuO formed in the second step in reactor B. To this end, reactor C is fed with stream 31, consisting of natural gas or another fuel gas that is capable of reducing CuO in an exothermic reaction, so that the heat released by the reduction reaction of CuO to Cu is sufficient to maintain, or help to maintain, the temperature of reactor C at calcination conditions, thereby causing the $CaCO_3$ present in the solids of stream 26 to decompose and generating gas stream 32, which is ideally formed by $CO_2$ and steam, from which it would be easy to separate and condition the $CO_2$ for permanent geological storage by means of purification and compression technologies that are a part of the state of the art. If synthesis gas (CO and $H_2$) is available, this would be preferable to natural gas for the CuO reduction step, due to the larger heats of reduction of one mole of CuO (especially in the case of CO). The resulting solids from reactor B (primarily $CaCO_3$ and CuO) are converted in reactor C into a mixture of CaO and Cu with which a new cycle may be started in reactor A. The operating temperature of reactor C must be high, preferably greater than 800° C., in order to favour the rapid decomposition of $CaCO_3$, and preferably less than 900° C., in order to reduce the problems of CaO de-activation and/or unwanted reactions of CuO (as it is known in the state of the art). Preferably, the working pressure of reactor C must be atmospheric or lower than the atmospheric pressure, in order to favour the decomposition of the carbonate. Optionally, stream 31 may be accompanied by an additional stream of steam, in order to reduce the partial pressure of $CO_2$ in the reaction atmosphere of reactor C, so as to accelerate the decomposition reaction of $CaCO_3$.

Optionally, for the thermal integration of the overall process, it may be beneficial to have a heat exchange system that supplies or removes heat from the solids present in steps or reactors A, B, C. In particular, for the optimal operation of the system, it may be especially useful to have a supply of external heat to reactor C (for example, by the combustion of $H_2$ or another fuel on the exterior of the reactors that contain the solids with $CaCO_3$ and CuO, or from the walls of the fuel cell where the $H_2$ generated in reactor A is oxidised). Although this external heat supply is not strictly necessary from a theoretical standpoint, it may facilitate the design and preparation of the solid materials or beds involved in the process, since it would allow them to be formulated with lower fractions of Cu/Ca in the sorbent. For the sake of simplicity, this option of the method has not been represented in FIG. 2.

The above method has been described on the assumption that all the gas-solid reactions involved are taking place in fixed-bed reactors. However other conceptually similar methods may be employed in different types of reactors e.g. interconnected fluidised-bed reactors used in $CO_2$ capture systems that use other high-temperature gas-solid reactions. But in this case, the latter would be an undesirable option, since it would require complex mechanical and solids transport systems in order to allow reactors A and B to operate under pressure, and reactor C to operate at atmospheric pressure. If the entire system were made to operate at atmospheric pressure, there would be a decrease in the overall energy efficiency of the system, since gas turbines could not be functioning and the energy initially contained in the natural gas would have to be extracted in the form of heat.

For these reasons a preferable option is to carry out the method of FIG. 2 using fixed-bed reactors, which allow for a more efficient utilisation of the characteristics of this method and benefit from the vast knowledge and practical experience related to the operation of fixed beds in Pressure Swing processes where gases and solids are handled at high pressures and temperatures.

Therefore, a more preferable option for the method illustrated in FIG. 2 is the use of reactor A as indicated in FIG. 3. In this case, the solids do not move between the reactors. It is the reaction front of the CaO-enhanced reforming reaction that moves through the bed of solids, with the same end result as that illustrated in FIG. 2. As can be seen in FIG. 3 and in one of the selected examples of the invention, the natural gas and steam that are fed into reactor A go through the first part of the bed (composed of $CaCO_3$ and Cu, i.e. product 13 in FIG. 2), and consequently, there is no reaction in that area. The overall steam reforming reaction of $CH_4$ and the simultaneous $CO_2$ absorption with CaO, are completed in the reaction front marked in FIG. 3. This front moves upwards as the solid reagent (CaO) is consumed. The gas produced at the exit of the reactor front is primarily $H_2$ and $H_2O$ (i.e. stream 12 in FIGS. 2 and 3).

When the CaO is consumed in reactor A, the pressure conditions and the gaseous reagents in the bed must be changed in order to initiate a second reaction step using the solids in the bed (now primarily $CaCO_3$ and Cu), as shown in FIG. 4, which corresponds to the operation of reactor B in FIG. 2. As mentioned above, the reactor of FIG. 4 must be operating at a high pressure in order to maximise the efficiency of the turbine (E) as shown in FIG. 2. The reaction conditions in reactor B must be adjusted in order for a reaction front to be formed so that the complete oxidation reaction of Cu to CuO takes place, as indicated in FIG. 4. The oxidising gas mixture (stream 21) that enters the reactor must do so at moderate temperatures, which may be even close to ambient temperature, and preferably less than 700° C., in order to reduce to a minimum the decomposition of the $CaCO_3$ that remains behind the reaction front. The highly exothermic character of the oxidation reaction of Cu to CuO causes a rapid heating of the gas and the solids in the reaction front, which must be controlled in order for the temperatures in the upper part of the reaction front not to exceed the values that cause the rapid decomposition of $CaCO_3$. This is achieved by causing most of the $O_2$ contained in stream 21 to be consumed at the end of the reaction front. This is achieved by adequately controlling the $O_2$ concentration and temperature in 21, by means of the recycle ratio and temperature of stream 25 (using heat exchanging systems known in the state-of-the-art). As will be shown in the example of this method, by designing correctly the mixture of solids in the bed (proportions of $CaCO_3$ and Cu and inerts), and by using the right operating conditions in reactor B, it is possible to obtain the complete conversion of Cu to CuO with very modest or acceptable conversions of $CaCO_3$ to CaO and $CO_2$. This objective of minimising the decomposition of $CaCO_3$ in the reactor where Cu is oxidised to CuO is essential for the main object of this embodiment of the invention.

Once the Cu has been consumed in the oxidation step described above, the resulting bed is one that is composed primarily of CuO and $CaCO_3$ and the last step of the method (represented by reactor C in FIG. 2) can then begin. As shown in FIG. 5, in this step the bed has two regions divided by a reaction front in which the rapid reduction of CuO to Cu with CH$_4$ takes place, generating heat that is used in the simultaneous decomposition of CaCO$_3$ to CaO. This step takes place after a decompression step and pre-heating of the bed (from its previous state, represented in FIG. 4), to ensure that the bed conditions are optimal for the rapid decomposition of CaCO$_3$, as mentioned above. The result of this step is a bed composed of CaO and Cu that is ready to begin a completely new cycle, starting again from the first reaction step (as shown in FIG. 3).

It is assumed that the operations involving the decompression and compression of fixed beds, the operations involving the intermediate conditioning of beds and the designing of the frequency and duration of the different steps necessary to achieve a continuous operation scheme are part of the state of the art in process engineering when working with gas-solid reactions that involve pressure swing and temperature swing adsorption processes (PSA and TSA).

A preferred fuel gas for this method is natural gas with a high concentration of CH$_4$. Any other fuel gas, including those resulting from any solid fuel gasification process (containing CO, H$_2$, C$_n$H$_m$O$_y$, H$_2$O, N$_2$, etc.), would be suitable for reactor A, although only fuel gases without relevant N$_2$ contents are desirable for reactor C, in order to maintain a high concentration of CO$_2$ and H$_2$O in stream 32. As previously discussed, gases with a high CO content are especially favourable in reactor C due to the high enthalpy of reduction of CuO with CO. Natural gases with a certain CO$_2$ content may likewise be fed directly to reactor A (dry reforming of methane with CO$_2$) and reactor C.

A second specific method characteristic of this invention and particularly applicable to the gasification of solid fuels (biomass, reactive coals and others) consist in producing gases with a high concentration of hydrogen and a gas stream with a high concentration of CO$_2$. FIG. 6 presents a diagram of such a method. As can be seen, it is a system with three interconnected circulating fluidised-bed reactors which have similar, albeit not identical, roles to those described in FIG. 2 for the first method. The novelty of this method with respect to that described in FIG. 2 is the integration of the solid fuel gasification step within fluidised-bed reactor A. This reactor is fed with stream 12, which contains a gasification agent (steam, air, oxygen or a mixture thereof), and stream 11, which contains a solid fuel, preferably one with a high reactivity and a low ash content, such as certain types of biomass. The gasification of solid fuels is already a part of the state of the art, but a characteristic aspect of this method is that a stream of circulating solids with the adequate content of CaO and Cu is entering the reactor, with objectives similar to those described in the first specific method, such that, in stream 12, the H$_2$ fraction is maximised with respect to other gasification gases while, in solid stream 13, most of the carbon originally contained in the solid fuel of stream 11 is found as CaCO$_3$. The solids leave reactor A and go towards reactor B where Cu is oxidised to CuO by air stream 21, without CaCO$_3$ decomposing. In this case, if the entire operation is performed at atmospheric pressure (in order to facilitate step C, described further below), it is important to work at temperatures that are preferably about 700° C. or lower in reactor B, in order to minimise CO$_2$ losses caused by the decomposition of CaCO$_3$. These temperatures may be achieved by employing a large amount of excess air over the stoichiometric (stream 21) for the oxidation of the Cu in stream 13 to CuO. However, in order to keep the losses of CO$_2$ diluted in the air flow to a minimum, the temperature must be controlled by extracting heat from reactor B, taking advantage of available methods to transfer heat from fluidised systems to steam circuits. Stream 22 leaves the system as a stream with a very high concentration of N$_2$, a low concentration of O$_2$ that has not reacted with Cu, and some CO$_2$ resulting from the slight, unwanted decomposition of CaCO$_3$ into CaO at the operating temperature of B. There may also be unreacted products of the carbonaceous material not reacted in A that reach reactor B in solid stream 13. Solid stream 26 leaves reactor B, ideally with a high concentration of CuO and CaCO$_3$, and enters reactor C. This reactor is also fed with a mixture of fuel gas in nitrogen-free stream 31, in order to exothermically reduce CuO to Cu and decompose CaCO$_3$. Preferably, the fuel gas of stream 31 is a synthesis gas (CO and H$_2$) resulting from a separate gasification step (not included in the figure for the sake of simplicity) using techniques and devices already known in the state of the art. Optionally, if the gas product from gasifier A (stream 12) is free of N$_2$ (as will be the case when air has not been used in the gasification reaction in A), gas 12 may also be used for the reduction of CuO to Cu in reactor C.

The application of this second specific method is especially appealing in the case of biomass, since its high reactivity allows high conversions of carbon to gases under the relatively mild gasification conditions in A, which allow the capture of CO$_2$ by CaO. Moreover, the permanent geological storage of the concentrated CO$_2$ that leaves the system in stream 32 makes the system represented in FIG. 5 a system with a net balance of negative emissions of CO$_2$, as has already been reported in other CO$_2$ capture systems that use biomasss as a fuel. The separation of solids and gases in circulating systems and the continuous transfer of solids, shown in FIG. 5, are considered to be part of the state of the art. Also considered as standard practice are the devices necessary to extract heat from the system of circulating fluidized beds and their optimal integration to ensure a better utilisation of heat in a steam cycle or in other applications.

A third specific method of this invention (FIG. 7) is particularly applicable to the capture of CO$_2$ from flue gases at atmospheric pressure produced by the combustion of any type of carbonaceous fuel (coal, natural gas, coke, fuel-oil, biomass, others) with air in new or already-existing large-scale devices. The stream of combustion gases 71 is fed into a new reactor F, which is characteristic of this specific method. This reactor contains the appropiate quantities of CaO and CuO (unlike reactor A of FIG. 2, which includes Cu and not CuO). Preferably, reactor F is a fixed-bed reactor operating at atmospheric pressure. For the sake of simplicity, FIG. 7 shows a diagram with continuous solid streams, which actually represent the movement of a reaction fronts across the corresponding fixed beds, in a similar to that explained in FIGS. 3, 4 and 5 for the first specific method described in this invention. However, reactor F is a new reactor where the only reaction that should take place is the carbonation of CaO to CaCO$_3$ with the CO$_2$ contained in the combustion gases of stream 71. Preferably, the reactor would operate at temperatures lower than 700° C., such that the equilibrium of CO$_2$ in CaO allows high CO$_2$ capture efficiencies and greater than 550° C., such that the recovery of the heat generated in the carbonation in stream 72 may be more efficient. Following the heat recovery step (not shown in the figure for the sake of simplicity), the combustion gases of stream 72 may be emitted to the atmosphere with a reduced CO$_2$ content. The solids of stream 73, saturated with CaCO$_3$ and still with the initial CuO content (which should have remained inert in the slightly oxidising environment of reactor F), enter regeneration reactor C. This reactor, which is conceptually identical to that described in FIG. 2 and in FIG. 5, is fed with a fuel gas that reduces CuO to Cu, operating under the conditions already described in the previous methods giving rise to concentrated CO$_2$ (stream 32). Preferably, the fuel gas of stream 31 is a synthesis gas (mixture of CO and H$_2$) with a low or zero content of nitrogen and other inerts, resulting from a gasification step which also uses coal (process not included in the figure for the sake of simplicity).

When the reduction step in reactor C is completed, the resulting solids in stream 33 pass on to reactor G, where the oxidation of Cu to CuO takes place. Reactor G is conceptually similar to the reactor B described in FIG. 2 and in FIG. 4, but with a significant difference: since Cu is now accompanied by CaO and not $CaCO_3$, it is no longer necessary to operate the reactor at moderate temperatures (as was the case with reactor B), in order to control the degree of decomposition of $CaCO_3$. The reactions in reactor G may be designed for much higher temperatures (although preferably lower than 900° C., in order to prevent the deactivation of solids and undesired CuO reactions), which will facilitate the energy efficient gas expansion in gas turbine E of stream 22, resulting from the reaction of the compressed air of stream 21 fed from compressor D into reactor G.

As was the case with FIG. 2, air 21 that enters reactor G is mixed with a low-temperature recycled $N_2$ (stream 25) obtained from outgoing stream 22, as was explained above, in order to moderate the temperatures in the Cu-to-CuO oxidation reaction front. It may also be necessary to raise the temperature of the gases fed into turbine E even more, in order to obtain even higher energy efficiencies. This can be done by feeding the turbine combustion chamber with more air through stream 42 and more fuel gas under pressure via stream 51, as explained in previous methods of this invention.

In order to understand the benefits of this third specific method, it is worth pointing out that, if the combustion gases of stream 71 reach the system of FIG. 7 at low temperature (which will certainly be the case if they are gases from already-existing thermal power plants), all the energy supplied to the system comes solely from the gas fuel of stream 31 fed into reactor C, and optionally, additional fuel 51. This energy can be easily recovered by means of the high-temperature CaO carbonation and Cu oxidation reactions which take place in reactors F and G, respectively. Therefore, the system's energy penalty is very low compared to other post-combustion $CO_2$ capture systems that have been described in the state of the art.

A fourth specific method of this invention, based on the preceding one, is particularly applicable to the generation of electricity by making use of existing combined cycles, in which the combustion under pressure of gaseous carbonaceous fuels (natural gas, synthesis gas, other hydrocarbons) is carried out before the expansion of the resulting gases in high-efficiency gas turbines. In this specific method (FIG. 8), the fuel of stream 53 is burnt with air under pressure (43) supplied from one or more compressors to turbine E. The resulting hot gases under pressure partially expand in the first section of the commercial gas turbine E, but they leave the turbine in stream 71 to enter, still at a high pressure, carbonation reactor F. Reactor F is a fixed-bed reactor and is similar to that described in the previous specific method, but, since it operates under pressure, it facilitates the absorption of $CO_2$ in the combustion gas by the CaO in the bed (the high partial pressure of $CO_2$ in stream 72 favours the carbonation reaction, compensating for the typical low $CO_2$ molar fractions in the combustion gas streams coming from the natural gas turbines). The decarbonised gases resulting from reactor F may continue to expand in another section of the gas turbine E or in some other type of turbine. Optionally, the inlet to this turbine may be adjusted to enable more fuel gas and more of the air of stream 52 to enter, so as to obtain the maximum possible efficiencies. The rest of the process diagram around reactors C and G is conceptually identical to that of the third specific method of the invention described above.

A fifth specific method of this invention (FIG. 9) is applicable to the capture of the $CO_2$ generated in the calcination of materials containing a certain amount of $CaCO_3$ or other carbonates. In general, the adequate mixture of a material ($CaCO_3$ is used here as an example) in a bed composed of particles or pellets containing CuO may allow the calcination of the material, as described in previous methods, in reactor C, producing a gas stream with a high concentration of $CO_2$. The solid material resulting from this reaction (Cu and CaO if the initial material is $CaCO_3$) may be oxidised (Cu to CuO) depending on the design of reactor G, in such a way that the energy initially contained in the fuel used for the reduction of CuO to Cu and the simultaneous decomposition of $CaCO_3$ is effectively recovered. Depending on the particle size distribution and the density of the initial particles of the material containing $CaCO_3$ in stream 1 and the particle size distribution and the density of the material containing CuO added to stream 92, it should be possible to separate the solids with a high concentration of CaO (91) from those with a high concentration of CuO (92) by mechanical methods. The overall result is the generation of a calcinated product in stream 91 and stream 32 with a high concentration of $CO_2$ derived from the initial stream of material to be calcinated (stream 1), achieving a very efficient use of the energy originally contained in the fuel.

Finally, it is worth noting that it is possible to design specific methods similar to those described above by replacing the Cu—CuO system with the CaS—$CaSO_4$ system, which also exhibits a sufficiently exothermic reduction reaction with some fuel gases, preferably with CO:

Although these systems are thermodynamically less favourable than the Cu—CuO system, due to the lower heats of reduction per mole of fuel gas, similar operation schemes may be proposed in these cases when a sufficiently large source of CO is available.

It is also possible to design specific methods similar to those described above by replacing the Cu—CuO system with the $Fe_2O_3$—FeO (or $Fe_3O_4$) system, which also exhibits a highly exothermic reduction reaction with some fuel gases, preferably with CO (−212 kJ/mol CO), or with synthesis gas with varying hydrogen contents:

One advantage of this system would be the greater heat of reaction per mole of fuel gas compared to the CuO reduction reaction, although this is negatively offset by the lower oxygen transport capacity per mass unit of oxide compared to the CuO—Cu system. Lower rates of reaction compared to the CuO—Cu system have also been reported for a variety of supports. However, other operation schemes may be proposed with solids that have overcome these practical limitations with appropiate sorbent manufacturing processes.

Throughout the description and the claims, the word "comprises" and similar expressions are not intended to exclude other technical characteristics, additives, components or steps. For those skilled in the art, other devices, advantages and characteristics of our invention may occur to readers of this description or to users of the invention. The following examples and drawings are provided for illustrative purposes and are not intended to limit the scope of this invention.

DESCRIPTION OF THE FIGURES

The figures are schematic. They attempt to reflect the most important aspects for putting in practice the different embodiments of this invention and facilitate an understanding of the main differences between this invention and the state of the art. They should not be considered as limiting the scope of the invention.

The numbered arrows in the figures represent the solid and gas mass streams interconnecting the reactors under continuous operation. The same arrows may also signify changes in step and reaction conditions over the same fixed bed of solids when it alternates between different reaction modes. The different types of reactors or reaction steps have been numbered with capital letters, by order of appearance in the description of the invention.

EXAMPLES

Below we will illustrate the invention using simulations performed by the inventors. Two examples of application for two preferred embodiments of the invention are provided to demonstrate the effectiveness of the $CO_2$ capture method. The calculations of the mass and energy balances, and the physical and chemical properties in these examples were made using a commercial process-simulation software package. The thermal integration details are omitted here and complete-conversion reactors are assumed for all the reactions involved. The applications of the method are intended for illustrative purposes. Potential improvements in the thermal integration of the process, or its integration in other auxiliary product purification units, may occur to those skilled in the art and may be introduced into the final process design without deviating from the concepts protected in the claims of this invention.

Example 1

Figure 1:
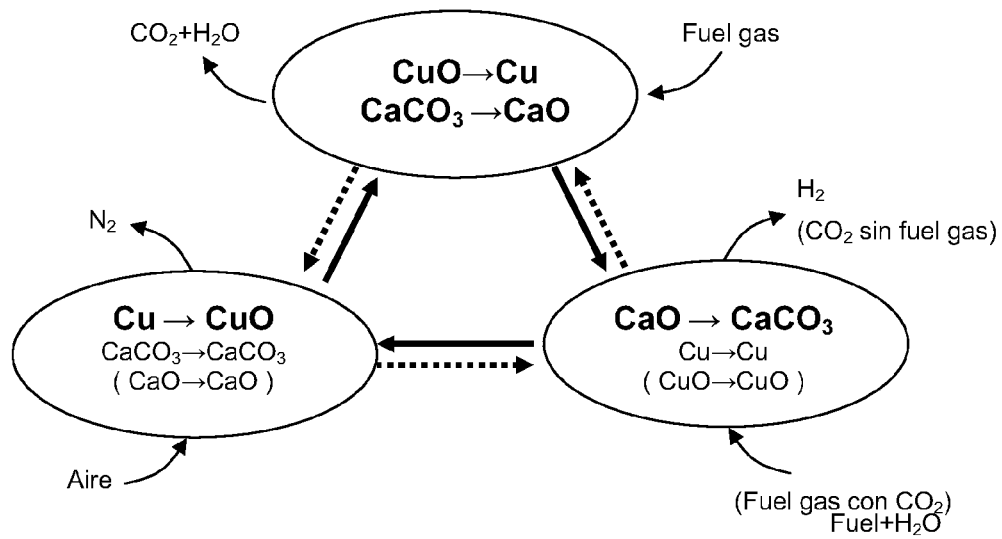
FIG. 1 illustrates the main reaction steps in all embodiments of the invention, and the main reagents and products for each step. The materials employed in the steps of the processes that capture $CO_2$ from combustion flue gases are indicated in parentheses and connected with dotted arrows.
Figure 2:
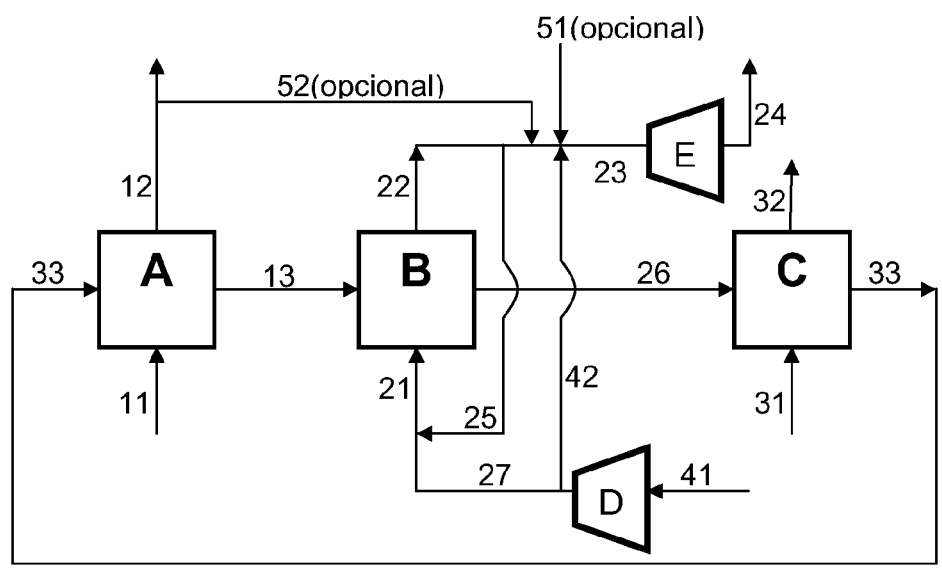
FIG. 2 illustrates a method for producing electricity and/or hydrogen from natural gas with an integrated $CO_2$ separation process, which includes a reforming step with absorption of $CO_2$ (in A), a Cu oxidation step (in B) and a $CaCO_3$ regeneration step using the heat from the reduction of CuO (C).

This example corresponds to the first main preferred embodiment of this invention as represented in FIG. 2. An illustrative example has been proposed for the reforming of 1 kmol/h of $CH_4$ (stream 11) in a fixed-bed reactor (reactor A) which contains a solid with the following formulation by weight percent: 10% of CaO, 25% of Cu and 65% of $Al_2O_3$. Moreover, for each kmol/h of $CH_4$, a molar flow rate of 3 kmol/h of steam is introduced into reactor A, which corresponds to an excess of 50% with respect to the stoichiometry of the reforming and $CO_2$ absorption reactions described in this patent. This allows all the equilibria involved in the system to shift towards the production of $H_2$. The bed of solids in reactor A is assumed to contain 1 kmol of CaO, which absorbs the $CO_2$ generated in the $CH_4$ reforming reaction in 1 hour. A gas stream leaves reactor A (stream 12) at a $H_2$ molar flow rate of 4 kmol/h and a steam molar flow rate of 1 kmol/h. Reactor A has been designed as an adiabatic equipment, since the slightly exothermic heat from the chemical reactions involved is used to heat of the reaction gases, in such a way that, although the inlet temperature of the $CH_4$-steam mixture is 200° C., the product gases (stream 12) leave the reactor at 655° C. Furthermore, in order to close the heat balance of reactor A, it must be taken into account that the solids are initially at 825° C., since they come from a high-temperature reduction cycle with simultaneous calcination (see below in this same example). Because the gas product (stream 12) can also be used as a fuel in a gas turbine (gas turbine E), reactor A operates at a pressure of 20 bar.

Reactor A will be operative for the production of $H_2$ until all the active CaO initially present (1 kmol) has been converted into $CaCO_3$. This will be the initial solid reagent for the reactor in FIG. 4, which illustrates the second reaction step in this method. A depleted air stream (5% by volume of $O_2$) is made to pass through this bed of solids, initially at a temperature of 655° C. and a pressure of 20 bar. The air comes from the mixture of compressed air obtained in compressor D and the partial recycling of the gas product (stream 25, composed of 99.8% by volume of $N_2$ and 0.2% by volume of $CO_2$, the latter resulting from the minor decomposition of $CaCO_3$) previously cooled to 350° C. in appropriate heat recovery equipment that is a part of the state of the art. The selection of this temperature may vary depending on the temperature at which the compressed air leaves compressor D and the temperature at which the reaction front in reactor B is to be operated. The objective of this gas stream diluted in $O_2$ passing through the bed, is to achieve the complete conversion of Cu to CuO (a very fast, exothermic reaction at temperatures higher than 600° C.), by at the same time minimising the decomposition of $CaCO_3$. In order to keep decomposition of $CaCO_3$ that may result from the heat released in the oxidation of reaction of Cu low, it was decided to set the temperature of the oxidation reactor at 725° C. Thus, even at maximum $CO_2$ partial pressure (the equilibrium partial pressure being 0.057 atmospheres at such a temperature), the high total pressure of the system (20 bar) will limit the volume fraction of $CO_2$ in the outlet gases from the oxidation reactor to below 0.3%. It may also be possible to use the recycled $N_2$ by varying its mass flow rate and its temperature in order to adjust the temperature of the oxidation front in the oxidation reactor, which is a significant advantage of this method. The solid present in reactor B has been completely converted to CuO when 616 kg of the gas mixture (stream 21) has passed through the bed. This quantity of gas may be made to pass at high flow rates in short times or at low flow rates in long times, depending several specific design variables. the estimation and practical implementation of which are considered to be part of the state of the art of the design of fixed-bed reactors with fast gas-solid reactions (i.e. "pressure swing" reactors or PSA). The gas stream that leaves reactor B (stream 22) is, in turn, divided into two streams. Stream 25 (16.6 kmol/h), which, as discussed above, will be used to generate the depleted air stream 21 together with stream 27. The remaining gas (4.1 kmol/h) will join stream 52 (resulting from extracting 3.35 kmol/h from stream 12). Therefore, this stream is a mixture of $H_2$ (35.7% by volume), steam (8.9% by volume), $CO_2$ (0.1% by volume) and $N_2$ (55.3% by volume) at a temperature of 690° C. and a pressure of 20 atmospheres. Subsequently, it is mixed with an air stream (stream 42) from the compressor, at a sufficient flow rate (10.5 kmol/h) for all the $H_2$ to be burnt in the gas turbine combustion chamber (turbine E) with 20% excess air. Due to the high calorific value of the $H_2$ (enthalpy of combustion of −241 kJ/mol) present in the gas mixture described above, the temperature of the resulting stream (stream 23) may in theory reach 1530° C. Subsequently, this gas could expand in a high-efficiency turbine E. The design of this turbine is a part of the state of the art. It can produce work and a stream of hot gases (710° C.) at atmospheric pressure susceptible to being cooled in a heat recovery boiler with a suitable design that is a part of the state of the art of boiler manufacturing. Finally, the cold gases (105° C.) leave the system with the following composition by volume: 74.6% $N_2$, 20.1% steam, 5.2% $O_2$ and 0.1% $CO_2$, the latter being the only loss of carbon to the atmosphere from the system proposed under the operating conditions described. This loss of carbon in the form of $CO_2$ has a molar flow rate of 0.01 kmol/h. A value that is much lower than the 1 kmol/h of $CH_4$ introduced into the reforming reactor (reactor A). Moreover, the remaining part of stream 12, that has not been transferred to stream 52 (1.65 kmol/h) is treated in process steps consisting of heat recovery, cooling and condensation of water in accordance with the methods described in the state of the art, to finally produce $H_2$ (1.32 kmol/h of $H_2$) that may be used in other processes. The operation of reactor B is completed when all the Cu present has been converted into CuO, resulting in a bed at a temperature of 725° C., a pressure of 20 atmospheres and the following composition by weight percent: 15.5% of $CaCO_3$, 0.1% of CaO, 27.4% of CuO and 57.0% of $Al_2O_3$.

An important operating variant of the oxidation reactor of this and other examples would be to accept higher losses of $CO_2$ by operating oxidation reactor B at a higher temperature. This would reduce the overall $CO_2$ capture efficiency, but this sacrifice could be compensated for by advantages such as: a reduced need for reducing gas to be introduced into reactor C (necessary to to raise the temperature of the solids up to calcination conditions), and an increase in the temperature of the gases that leave the oxidation reactor and that are fed into the gas turbine. As an example of this variant, it may be seen that, if a temperature of 815° C. were allowed in reactor B, the decomposition of $CaCO_3$ would produce 0.046 kmol/h of $CO_2$, which would be emitted to the atmosphere. This value is still low compared to the 1 kmol/h of C fed into the system as $CH_4$.

Figure 5:
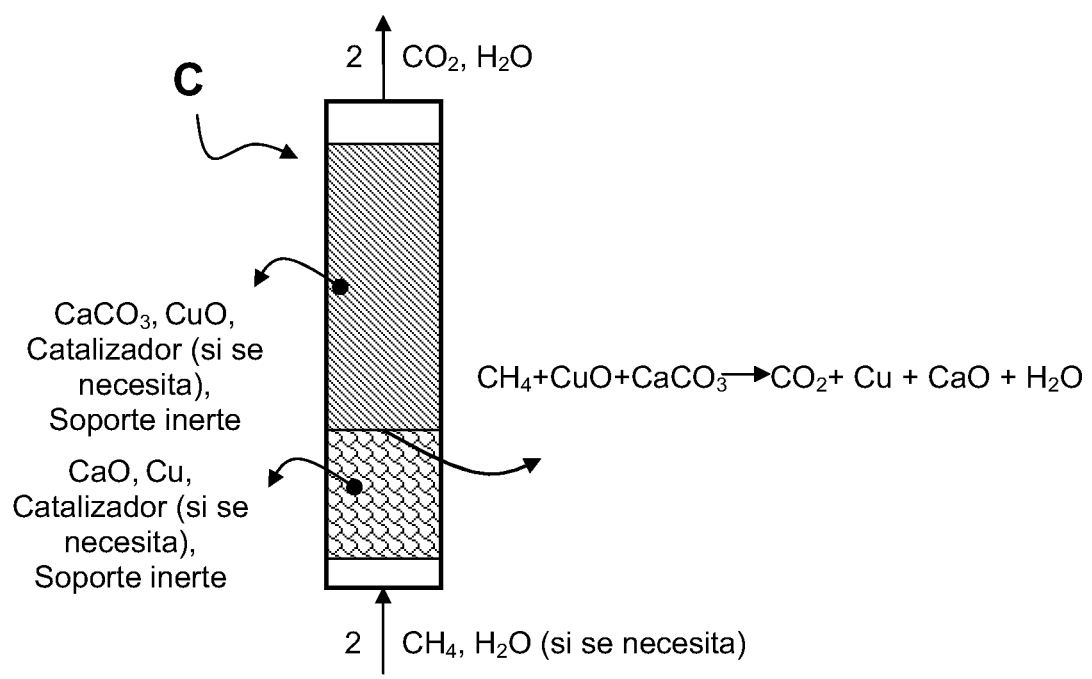
FIG. 5 illustrates the reduction of CuO to Cu with methane and the simultaneous decomposition of $CaCO_3$ to CaO in a fixed bed reactor (C in FIG. 2).
Figure 6:
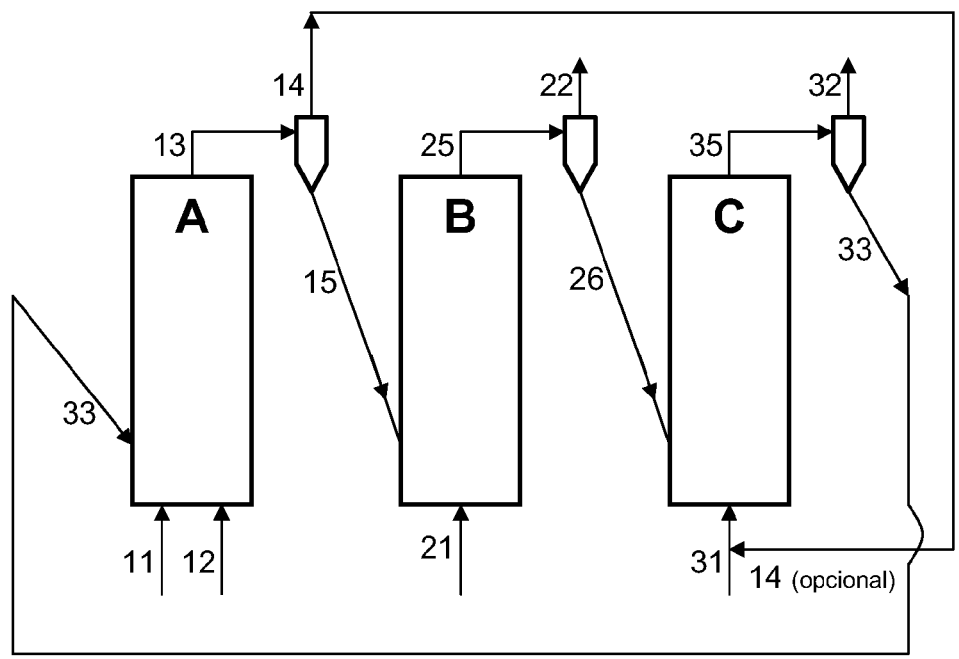
FIG. 6 illustrates a method for producing electricity and/or hydrogen from solid fuels with a $CO_2$ integrated separation process. This consists of three steps in fluidised beds: a gasification step including the absorption of $CO_2$ (in A), a Cu oxidation step (in B) and a $CaCO_3$ regeneration step employing the heat from the reduction of CuO (C).

In any case, the solid resulting from the previous oxidation step will be used as the starting raw material for the third, and last, step of the cycle, which is represented by stream 26 of FIG. 2 and FIG. 5 itself. This step is performed in the so-called reactor C, where the decomposition of $CaCO_3$ into CaO and $CO_2$ takes place (endothermic reaction) by means of the reduction of CuO to Cu (exothermic reaction), in accordance with the diagram in FIG. 5. In accordance with the state of the art described above, these reactions will be sufficiently rapid so as to assume the existence of a reaction front such as that shown in FIG. 5. Before carrying out any operation in reactor C, it will be necessary to reduce its pressure from 20 to 1 atmosphere, since, in this way, depending on the partial pressure of $CO_2$ in the reaction medium, the calcination of $CaCO_3$ may be performed at temperatures lower than 850° C., as described in the state of the art. Moreover, and also in accordance with the state of the art, temperatures greater than 830° C. might lead to a premature deterioration of the Cu supported on $Al_2O_3$, which is undesireable, since the system must be capable of performing numerous cycles before the reacting solid material can be discarded. The technology and methodology for depressurising fixed beds correctly is a part of the state of the art related to the operation of pressure swing fixed beds processes (PSA). In order to reduce CuO to Cu, it is necessary to introduce a reducing agent into the system, which is represented by stream 31 in FIG. 2. This reducing agent may be $CH_4$, synthesis gas (with varying CO:$H_2$ ratios, preferably high in CO due to the greater heat of reduction of CuO with this gas), or any other reducing gas that is capable of exothermically reacting with CuO or mixtures of them. In this example, a stream of synthesis gas composed of 60% by volume of CO and 40% volume of $H_2$ has been used. These gases can be obtained from the gasification or the reforming of solid, liquid or gaseous hydrocarbons. By supplying 2.2 kmol/h of this mixture at a temperature of 700°0 C. and a pressure of 1 atmosphere, the total reduction of CuO to Cu is achieved simultaneously with the calcination of $CaCO_3$ to CaO and $CO_2$, in such a way that a solid product is obtained, at a temperature of 825° C. and a pressure of 1 atmosphere, with the following composition in weight percent: 10% of CaO, 25% of Cu and 65% of $Al_2O_3$. It may be observed that this composition matches exactly the appropriate composition needed to once again the first step of the cycle, which is represented, in FIG. 2, by stream 33 and reactor A. Furthermore, in order to reduce the concentration of $CO_2$ below that imposed by equilibrium, it is necessary to add 3.5 kmol/h of steam at 800° C. and at atmospheric pressure. Another option, which was not used in this example, would be to operate reactor C at a pressure below atmospheric pressure, in order to facilitate the calcination of $CaCO_3$ at the operating temperature of C. In this way, with the addition of steam, the gas stream that leaves reactor C (stream 32) would be composed of $CO_2$ (31.6% by volume) and steam (68.4% by volume), at a pressure of 1 atmosphere and a temperature of 825° C. It would be possible to recover heat from this high temperature gas in a recovery boiler as part of the state of the art related to boiler manufacturing. After condensing the water, a stream of $CO_2$ with a very high concentration of this gas would be obtained which, after purification, could be used for permanent geological storage or other industrial processes described in the state of the art that are beyond the scope of this patent.

It is worth noting that this example is intended for illustrative purposes only. There are various variants and adjustments that could be made in order to optimise the process conditions for the different uses intended as the final energy product (electricity and/or hydrogen) and the characteristics of reactors and materials used in the method. These alternatives would obviously be included within the scope of this invention.

Example 2

This illustrative example corresponds to the fourth method of this invention, which describes the separation of $CO_2$ diluted in a stream of combustion gases at atmospheric pressure emitted, for example, from a thermal power plant. The Figure that represents this example is FIG. 7, and all the streams and reactors refer to this Figure. In this case, the reference is to an existing coal combustion thermal power plant with a gross electric power output of 350 MWe and a desulfurisation system for the entire installation prior to the $CO_2$ capture system. Thus, a stream (stream 71) would be made to enter the proposed $CO_2$ separation system at a molar flow rate of 46,729 kmol/h and with the following composition by volume percent: 75.6% $N_2$, 15.7% $CO_2$, 6.1% $H_2O$ and 2.6% $O_2$. This gas stream would enter reactor F at a temperature of 150° C. Reactor F is a fixed bed operating in a similar mode to that in FIG. 2, except that, instead of Cu, there is CuO in the initial bed of solids. The flue gas meets a solid reaction front at 600° C. with the following formulation expressed in weight percent: 10% of active CaO, 40% of CuO and 50% of $Al_2O_3$. When the gas passes through reactor F, the exothermic carbonation of CaO takes place and stream 72 is obtained. This has a reduced $CO_2$ content (3% by volume), but it is slightly greater than that set by equilibrium (1.9% by volume of $CO_2$) at the reactor outlet temperature (653° C.). This first $CO_2$ capture operation is completed when all the CaO has been carbonated, in such a way that the resulting fixed bed has captured 0.063 kg of $CO_2$ for every kg of initial sorbent. Thus, the final solid has the following composition expressed in weight percent: 13.4% of $CaCO_3$, 1.9% of CaO, 37.6% of CuO and 47.1% of $Al_2O_3$. Stream 72 may be emitted to the atmosphere after heat recovery in a boiler with characteristics and an operation mode that is part of the state of the art.

Figure 4:
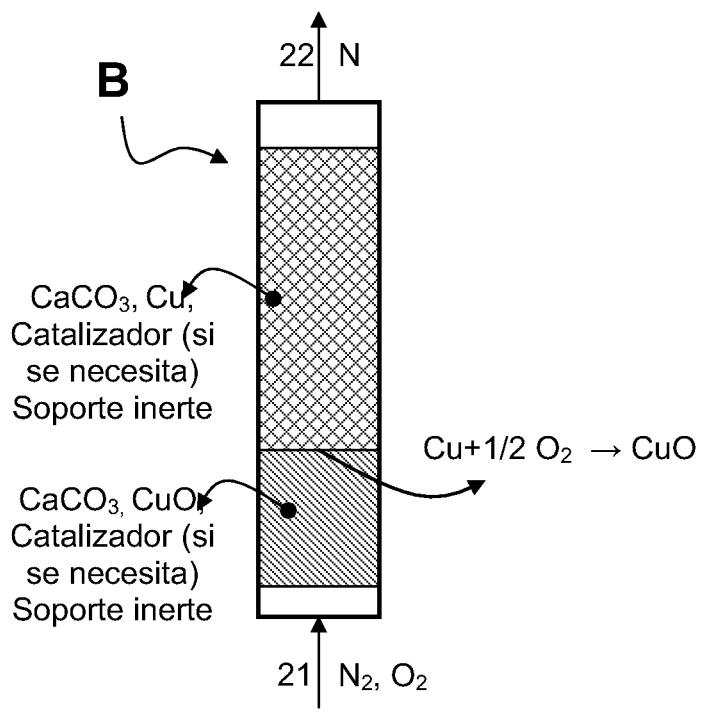
FIG. 4 illustrates the oxidation of Cu to CuO with air in a fixed bed reactor (B in FIG. 2).
Figure 7:
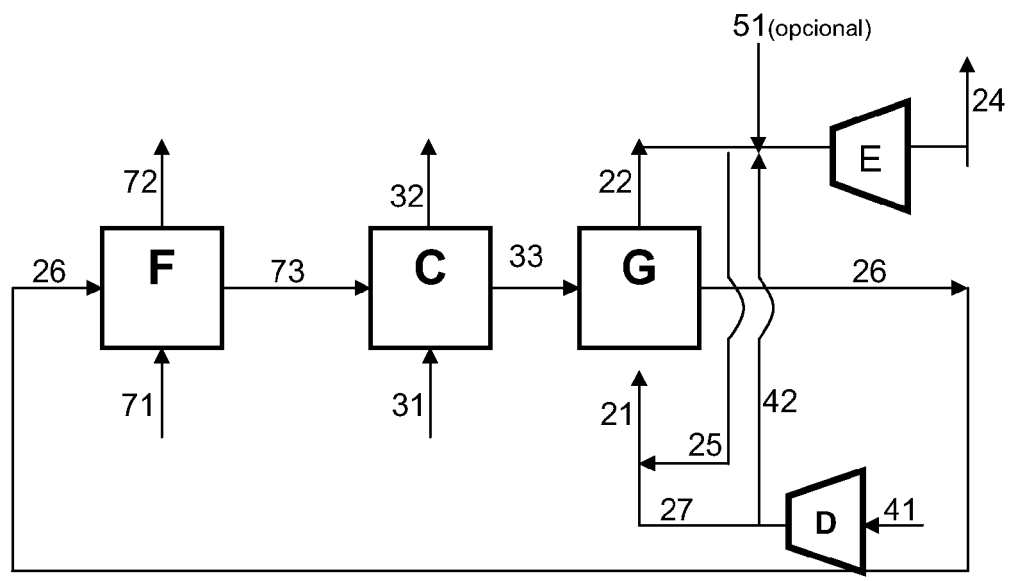
FIG. 7 illustrates a method of capturing $CO_2$ from combustion gases at atmospheric pressure, in three steps: a $CO_2$ absorption step, in a fixed bed of CaO and CuO (F), a $CaCO_3$ regeneration step using the heat from the reduction of CuO (C), and a Cu oxidation step in a fixed bed of CaO and Cu (G).
Figure 8:
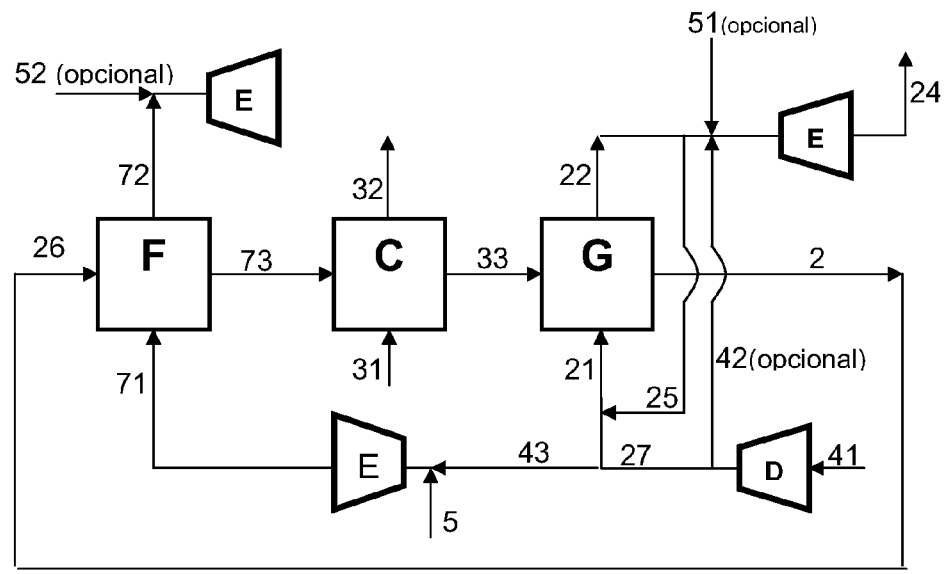
FIG. 8 illustrates a method of capturing $CO_2$ from combustion gases at high or medium pressure, in three steps: a $CO_2$ absorption step, in a fixed bed of CaO and CuO (F), a $CaCO_3$ regeneration step employing the heat from the reduction of CuO (C), and a Cu oxidation step in a fixed bed of CaO and Cu (G).
Figure 9:
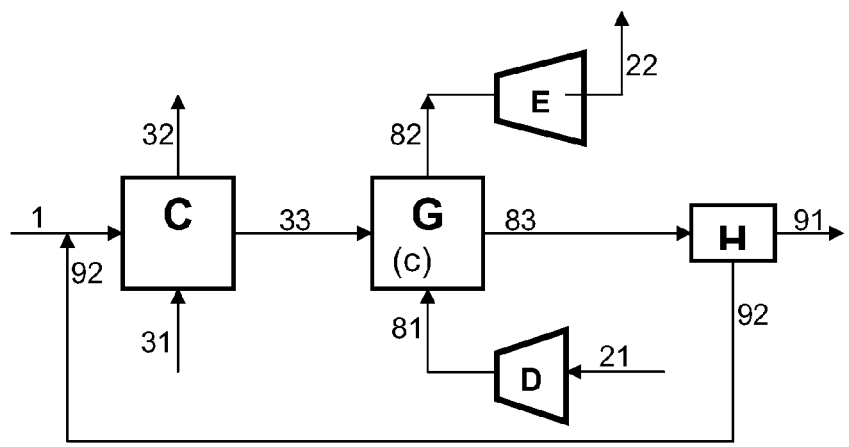
FIG. 9 illustrates a method of capturing the $CO_2$ released by the decomposition of carbonates and/or the combustion of the fuel necessary for the decomposition, in three steps: a $CaCO_3$ regeneration step using the heat from the reduction of CuO (C), a Cu oxidation step in a fixed bed of CaO and Cu (G), and a physical separation step (H) involving Cu and/or CuO from solids with CaO and/or $CaCO_3$.

The second reaction step undergone by the bed of solids is conceptually represented by stream 73, which enters reactor C in FIG. 7. The desired operation and reactions in reactor C are illustrated in FIG. 4. In reactor C, the regeneration of the calcium sorbent, i.e. the decomposition of $CaCO_3$ into CaO and $CO_2$, takes place. The energy necessary to perform this endothermic reaction will be supplied by the reduction of the CuO present in the sorbent by means of a reducing gas (stream 31). In order to prevent the degradation of the sorbent (especially the supported Cu, as described in the state of the art), the operating temperature of the reactor is limited to 850° C. Under these conditions, the partial pressure of $CO_2$ at the exit will be 0.48 atm. As an example, if a synthesis gas (20,649 kmol/h) composed of 67% by volume of $H_2$ and 33% by volume of CO is proposed as the reducing gas, the temperature of the bed in the reaction front will rise to 850° C. and the volume percentage of $CO_2$ at the outlet of reactor C will be 47.8% by volume, still slightly lower than the equilibrium value. However, if a synthesis gas (20,649 kmol/h) is available with a 60% volume of CO and a 40% volume of $H_2$, and the same solid formulation and reaction temperature (850° C.) is maintained, it will be necessary to add steam (12,000 kmol/h at a temperature of 450° C. and atmospheric pressure in this example) to reactor C in order to reduce the partial pressure of $CO_2$ in such a way that the volume percentage thereof at the outlet is 47.4%. The 20,649 kmol/h of synthesis gas (necessary to reduce all the CuO present in the sorbent, heat up the bed and the gaseous reagents, and decompose the $CaCO_3$) may be obtained from the gasification or reforming of fossil or biomass fuel, and the specific process to be used is a part of the state of the art of gasification and reforming processes. The reaction product will be a stream of hot gas at 850° C. and at atmospheric pressure (stream 32). The molar flow rate will depend on the composition of the synthesis gas selected to perform the reduction of CuO. Energy can be recovered in an appropriate heat recovery boiler that is a part of the state of the art. After the cooling and condensation of the water, it is possible to obtain a stream with a high concentration of $CO_2$. On the other hand, the solid remains in the fixed-bed reactor at a temperature of 850° C., with the following composition by weight percent: 10.9% of CaO, 34.8% of Cu and 54.3% of $Al_2O_3$.

Figure 3:
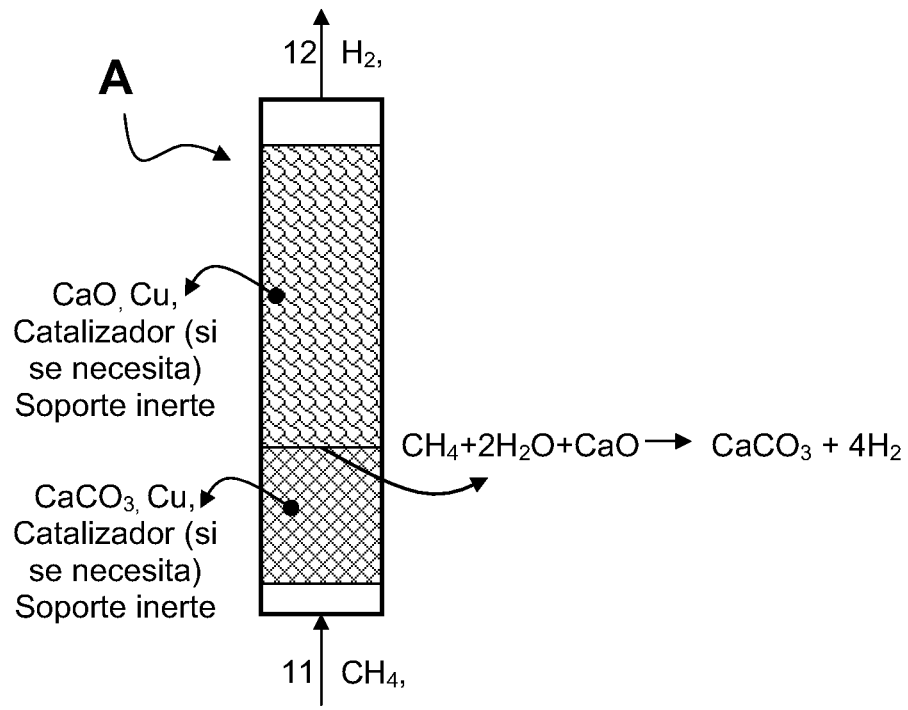
FIG. 3 illustrates the reforming step of $CH_4$ including the absorption of $CO_2$ in a fixed bed reactor (A in FIG. 2).

Once the entire mass of $CaCO_3$ has been converted to CaO and the entire mass of CuO has been converted to Cu, it is necessary to once again oxidise the latter metal so that it may be reused for the previous step. The oxidation of Cu is performed in step 3, which is conceptually represented by reactor G and stream 33 in FIG. 7. The desired operation and reactions in reactor G are similar to those of the reactor in FIG. 3, but with one significant difference: since there is no $CaCO_3$ in reactor G, it is not necessary to limit the operating temperature so much, because $CaCO_3$ has already been calcinated at the beginning of this step. Therefore, in order to perform the oxidation, compressed air (stream 21) at 20 atmospheres is used. This comes from compressor D. In this example, it was decided to work at 850° C. 155,000 kmol/h of the gas leaving reactor G is re-circulated and cooled down from a temperature of 850° C. to 375° C. (stream 25), and then it is mixed with the air from compressor D. The final quantity of gas to be re-circulated will also depend on the temperature of the compressed air at the outlet of compressor D, the design of which is a part of the state of the art related to the design and building of compression equipment. Thus, the concentration of $O_2$ in the stream that oxidises the CuO is reduced to 5% by volume, since the re-circulated gas is composed solely of $N_2$ (reactor G is a fixed-bed reactor and it is assumed that the reaction front consumes the $O_2$ in a narrow layer of the bed). In this way, all of the Cu is once again oxidised to CuO, and a solid with the following composition by weight percent is obtained: 10% of CaO, 40% of Cu and 50% of $Al_2O_3$, a composition which is identical to that of the sorbent necessary to perform step 1 (starting solid in reactor F, or stream 26). On the other hand, the hot gases that leave reactor 22 are at a high temperature (850° C.) and a pressure of 20 atmospheres. For this reason, it is possible to recover part of their energy in a high-efficiency gas turbine (turbine E). In order to increase the energy efficiency of the system, it is proposed more air and synthesis gas (60% CO and 40% $H_2$) to be fed to the turbine combustion chamber. Upon burning with air, this will raise the temperature of the final stream to 1,550° C., before it enters the gas turbine. At the gas turbine outlet, a stream of combustion gases (stream 22) is obtained, at a temperature of 660° C. and a molar flow rate of 65,700 kmol/h, from which heat can be recovered in a boiler designed in accordance with the state of the art for this type of equipment.

The invention claimed is:

1. A cyclic method for capturing the $CO_2$ contained in a gas stream, said method comprising reacting the gas stream with a mixture containing at least solid CaO and a second solid or the oxidised form of the second solid, wherein the oxidised form of the second solid undergoes an exothermic reduction reaction with a fuel gas so that the heat released during the reaction is used for the decomposition of $CaCO_3$.

2. The method of claim 1, wherein the second solid is a metal or the oxidised form thereof, or an alkaline-earth sulfide or sulfate.

3. The method of claim 2, wherein the second solid is Cu and its oxidised form CuO.

4. The method of claim 2, wherein the second solid is CaS and its oxidised form $CaSO_4$.

5. The method of claim 1, comprising:
a) Carbonation of CaO with the $CO_2$ contained in the gas stream to be treated, in the presence of the second solid in its reduced form;
b) Oxidation of the second solid of step (a) with air, in the presence of the $CaCO_3$ formed in the carbonation of CaO; and
c) Reduction of the oxidised form of the second solid obtained in step (b) with a fuel gas and the simultaneous calcination of $CaCO_3$.

6. The method of claim 1, wherein the gas stream to be treated comes from a gas reforming process or a solid fuel gasification process.

7. The method of claim 6, wherein the solid fuels are selected from the group consisting of biomass and reactive coals.

8. The method of as claimed in claim 1, comprising:
a) Carbonation of CaO with the $CO_2$ contained in the gas stream to be treated, in the presence of the second solid in its oxidised form;
b) Reduction of the oxidised form of the second solid with a fuel gas and simultaneous calcination of the $CaCO_3$ obtained in step (a); and
c) Oxidation of the reduced form of the second solid obtained in step (b) with air, in the presence of the CaO formed in the calcination of $CaCO_3$.

9. The method of claim 8, wherein the gas stream to be treated comes from a carbonaceous fuel combustion process.

10. The method of claim 1, wherein the fuel gas for the reduction of the oxidised form of the second solid is selected from the group consisting of natural gas, synthesis gas and a gasification gas with a high CO content and a low $N_2$ content.

11. The method of claim 10, where the fuel gas for the reduction of the oxidised form of the second solid is gasification gas with a high CO content and a low $N_2$ content.

12. The method of claim 1, where part of the gas resulting from the metal oxidation step is cooled and re-circulated and mixed with the air used in the metal oxidation step.

13. The method of claim 12, wherein the rest of the gas resulting from the metal oxidation step is mixed with air and a fuel, and made to expand in a gas turbine.

14. The method of claim 1, wherein the oxidation step is performed at a temperature of between 700° C. and 900° C., and at a pressure of between 20 and 30 atmospheres.

15. The method of claim 1, wherein the reduction and calcination decomposition steps are performed at a temperature of between 800° C. and 1,000° C. and at a pressure equal to or lower than atmospheric pressure.

16. The method of claim 1, wherein the reduction and decomposition steps are performed with an additional feeding of steam.

* * * * *